US009947055B1

(12) United States Patent
Roumeliotis (10) Patent No.: US 9,947,055 B1
(45) Date of Patent: Apr. 17, 2018

(54) SYSTEM AND METHOD FOR MONITORING MERCHANT TRANSACTIONS USING AGGREGATED FINANCIAL DATA

(71) Applicant: Intuit Inc., Mountain View, CA (US)

(72) Inventor: George Roumeliotis, Menlo Park, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 14/167,897

(22) Filed: Jan. 29, 2014

(51) Int. Cl.
*G06Q 20/04* (2012.01)
*G06Q 40/00* (2012.01)

(52) U.S. Cl.
CPC .................. *G06Q 40/12* (2013.12)

(58) Field of Classification Search
CPC ........ G06Q 40/12; G06Q 20/04; G06Q 20/10; G06Q 40/00
USPC ......................................... 705/30, 39, 44, 67
See application file for complete search history.

(56) References Cited

U.S. PATENT DOCUMENTS

| 7,275,685 B2 * | 10/2007 | Gray et al. ..................... 235/380 |
| 7,702,578 B2 * | 4/2010 | Fung ...................... G06Q 20/10 705/39 |
| 8,266,021 B2 * | 9/2012 | Koukis ........................... 705/30 |
| 8,429,068 B1 * | 4/2013 | Fasoli ..................... G06Q 30/06 705/1.1 |
| 8,498,934 B2 * | 7/2013 | Todd .................... G06Q 20/202 235/379 |
| 8,639,629 B1 * | 1/2014 | Hoffman ......................... 705/67 |
| 2002/0077978 A1 * | 6/2002 | O'Leary et al. ........ G06Q 20/04 705/40 |
| 2004/0039693 A1 * | 2/2004 | Nauman et al. ................ 705/39 |
| 2006/0149671 A1 * | 7/2006 | Nix .......................... G06Q 20/04 705/40 |
| 2008/0048025 A1 * | 2/2008 | Fitzgerald .............. G06Q 20/10 235/380 |
| 2010/0169194 A1 * | 7/2010 | Richey et al. ........ G06Q 10/087 705/30 |
| 2011/0035294 A1 * | 2/2011 | Mizrah .................... G06F 21/33 705/26.42 |
| 2011/0196791 A1 * | 8/2011 | Dominguez .................... 705/44 |
| 2011/0251934 A1 * | 10/2011 | Satyavolu .............. G06Q 30/06 705/30 |

(Continued)

OTHER PUBLICATIONS

Rondeau, "Innovation in Coool" dated Jul. 18, 2011, http://www.incontextdesign.com/innovationincool/post/mint-com/ (5 pages).

*Primary Examiner* — Vanel Frenel
(74) *Attorney, Agent, or Firm* — Vista IP Law Group LLP (57) ABSTRACT

A computer-implemented method of detecting a merchant with chargeback activity includes a computing device receiving merchant financial data from a plurality of different financial service providers, wherein the merchant financial data comprises chargebacks. The computing device aggregates the received merchant financial data into, for example, a database. The computing device analyzes the aggregated merchant financial data of a single merchant for a chargeback characteristic and the computing device flags the merchant when the chargeback characteristic exceed preset threshold levels. A flagged merchant may trigger an optional notification to one or more of the financial service provider (e.g., card issuer), the acquiring bank, the merchant, or the customer.

19 Claims, 7 Drawing Sheets

(56) References Cited

U.S. PATENT DOCUMENTS

| | | | | |
|---|---|---|---|---|
| 2012/0016783 A1* | 1/2012 | Vasten | ............... | G06Q 20/22 |
| | | | | 705/30 |
| 2012/0116933 A1* | 5/2012 | Matthews | ............. | G06Q 10/04 |
| | | | | 705/30 |
| 2014/0156473 A1* | 6/2014 | Murphy | ............... | G06Q 40/02 |
| | | | | 705/30 |

* cited by examiner

SYSTEM AND METHOD FOR MONITORING MERCHANT TRANSACTIONS USING AGGREGATED FINANCIAL DATA

SUMMARY

The methods and systems described herein relate to using aggregated merchant transaction data to more rapidly track and address suspect or problematic merchants. Merchant transaction data from a plurality of customers of a particular merchant are aggregated within a database. The aggregated data includes merchant transaction data from a number of different payment processors. For example, the aggregated merchant transaction data may include financial transactions facilitated or otherwise processed by different credit or debit card issuers. Aggregated merchant transaction data may also include payment processors that do not utilize a card (e.g., PAYPAL payment processor). As an example, the aggregated merchant financial data may include VISA credit card transaction data that was generated by a credit card issued by Bank A. The same database may also contain MASTERCARD® credit card transaction data that was generated by a credit card issued by Bank B. Likewise, the database may also contain PAYPAL transaction data that was generated using PAYPAL electronic payment method. PAYPAL is a registered trademark of PayPal, Inc., San Jose, Calif., VISA is a registered trademark of Visa International Service Association, Foster City, Calif. and MASTERCARD is a registered trademark of MasterCard International Incorporated, New York, N.Y.

In a preferred embodiment of the invention, the merchant transaction data includes transaction data that is associated with or carries the indicia of suspect or problematic activity on the part of merchants. As one particular example, the merchant transaction data includes transaction data pertaining to chargebacks. A "chargeback" is a transaction that is returned to a merchant or a merchant's acquiring bank as a financial liability. The reasons for such chargebacks may be numerous but they are often as a result of a disputed transaction. In one preferred aspect of the invention, the database contains aggregated chargeback transaction data from different credit issuers, debit card issuers, and other payment processors that is linked to a particular merchant. The system and method may employ a merchant analyzer to analyze the database to identify or flag merchants that have number of chargeback transactions that exceed a particular threshold or limit. The system and method may also identify or flag merchants that meet or exceed a particular velocity of chargebacks. The term "velocity" in this context is meant to indicate the number of chargeback transactions that occur over a shorter period of time than, for example a typical monthly cycle. Chargeback transactions may also be identified or flagged if the chargebacks have high dollar amounts.

Importantly, the chargeback transaction data that is contained in the database is aggregated with data from a number of different card issuers or payment processors for a single merchant. For example, an electronics retailer that ships products throughout the U.S. may accept payments from VISA® debit or credit cards, MASTERCARD debit or credit cards, AMERICAN EXPRESS credit cards, the DISCOVER credit card, as well as PayPal electronic payment services. AMERICAN EXPRESS is a registered trademark of American Express Marketing & Development Corp., New York, N.Y., and DISCOVER is a registered trademark of Discover Financial Services Corporation, Riverwoods, Ill. Customers purchasing electronics goods that are shipped out may use any one of these payment methods.

In one aspect of the invention, merchant transaction data from a number of different customers of this particular merchant is aggregated into a database. This database is then periodically or continuously scanned or analyzed by a merchant analyzer for the presence of problematic merchant transactions like chargebacks. The merchant analyzer is advantageously able to identify and flag merchant transactions like chargebacks that occur across a plurality of different payment platforms (e.g., VISA, MASTERCARD, AMERICAN EXPRESS and DISCOVER credit cards, PAYPAL electronic payment services, and the like).

While chargebacks have been monitored at the merchant level, this monitoring of chargebacks has been done on a single platform and not across multiple platforms as contemplated herein. For example, a credit card company such as Visa International Service Association may monitor chargeback activity on a periodic (e.g., monthly) basis and alerts acquiring banks when one of their merchants has excessive chargebacks. This monitoring may also happen at the acquiring bank level however, again, this monitoring occurs on a single platform (e.g., MASTERCARD credit card transactions).

A problem with the above-noted known methods of monitoring chargebacks is that the monitoring activities are narrowly focused within a single proprietary platform. Typically, however, merchants have a number of payment processing options available for customers in order to purchase goods or services. While chargeback monitoring of a merchant within a single platform may provide some useful feedback information on the performance (or non-performance) of merchants, it is a very narrow view of the financial transactions that occurring at a particular merchant. Moreover, the known methods described above may identify merchants having an unusual number of chargebacks only after a rather long period of time has elapsed (e.g., thirty days or so for once a month look-backs as described above).

The system and method disclosed herein overcomes these deficiencies. First, the system and method is able to identify or flag merchant transactions of interest at a single merchant that have occurred on different payment platforms. This is important because if one where to look at, for example, chargebacks occurring on a single platform (e.g., VISA® credit card from Bank A) the amount (or even velocity) of chargebacks may not be sufficient to raise any warnings on the part of Bank A. In contrast, the system and method described herein is able to look at, for example, chargebacks across the VISA credit card from Bank A but also, for instance, MASTERCARD credit cards issued by Bank B. In this particular situation, the combined view of chargebacks across both the VISA and MASTERCARD platforms may rise to a sufficient number or velocity so as to raise suspicions about this particular merchant. Moreover, in certain embodiments described more fully herein, the aggregated merchant transaction data may be obtained more frequently or even in real-time or near real-time enabling problematic or suspect merchants to be identified more quickly.

In one additional embodiment or aspect of the system and method, once a merchant has been identified as suspect or problematic, a notification may be sent out to, for example, card issuers or other payment processors. In some instances, card issuers or payment processors may be notified even though their own proprietary platform did not contain any unusual number of problematic transactions (e.g. chargebacks). In some instances, notifications may also be sent to one or more customers or users identifying that a particular merchant has been flagged, for example, for an excessive number of chargebacks. Alternatively, another database may be populated with merchant information for those merchants that have been identified or flagged using the system and methods described herein. Consumers may access this database to better inform themselves whether or not they wish to engage in future commerce with such merchants. In yet another option, the acquiring banks or merchants themselves may receive a notification that they have been identified or otherwise flagged as having an excessive amount of chargebacks (or, for example, a high velocity of chargebacks). This may enable the merchant to institute corrective action to fix the problems causing the chargebacks.

In one embodiment, a computer-implemented method of detecting a merchant with chargeback activity includes a computing device receiving merchant financial data from a plurality of different financial service providers, wherein the merchant financial data comprises chargebacks. The computing device aggregates the received merchant financial data into, for example, a database. The computing device analyzes the aggregated merchant financial data of a single merchant for a chargeback characteristic and the computing device flags the merchant when the chargeback characteristic exceed preset levels. A flagged merchant may trigger an optional notification to one or more of the financial service provider (e.g., card issuer), the acquiring bank, the merchant, or the customer.

In another embodiment, a system for detecting a merchant with chargeback activity includes a computing device configured to receive merchant financial data from a plurality of different financial service providers, wherein the merchant financial data comprises chargebacks. The system includes a database operably connected to the computing device and configured to contain aggregated merchant financial data. The system includes a merchant chargeback analyzer executable by the computing device, the merchant chargeback analyzer configured to analyze aggregated merchant financial data of a single merchant for a chargeback characteristic. The computing device is configured to flag the merchant when the chargeback characteristic exceed preset levels.

In another embodiment, a computer-implemented method of detecting businesses with problematic payment histories includes a computing device receiving financial transaction data from a plurality of different merchants, wherein the financial transaction data comprises payment data of businesses engaging in commerce with said merchants. The computing device aggregates the received financial transaction data. The computing device analyzes the aggregated financial transaction data for payment characteristic for the businesses and flags or identifies a business when the payment characteristic of a business exceeds a preset threshold.

In another embodiment, a system for detecting businesses with problematic payment histories includes a computing device configured to receive financial transaction data from a plurality of different merchants, wherein the financial transaction data comprises payment data of businesses engaging in commerce with said merchants. The system includes a database operably connected to the computing device and configured to contain aggregated financial transaction data. The system also includes a pay history analyzer executable by the computing device, the pay history analyzer configured to analyze aggregated financial transaction data of a single business for a payment characteristic. The computing device is configured to flag or identify the business when the payment characteristic exceeds a preset threshold.

DETAILED DESCRIPTION OF ILLUSTRATED EMBODIMENTS

Figure 1:
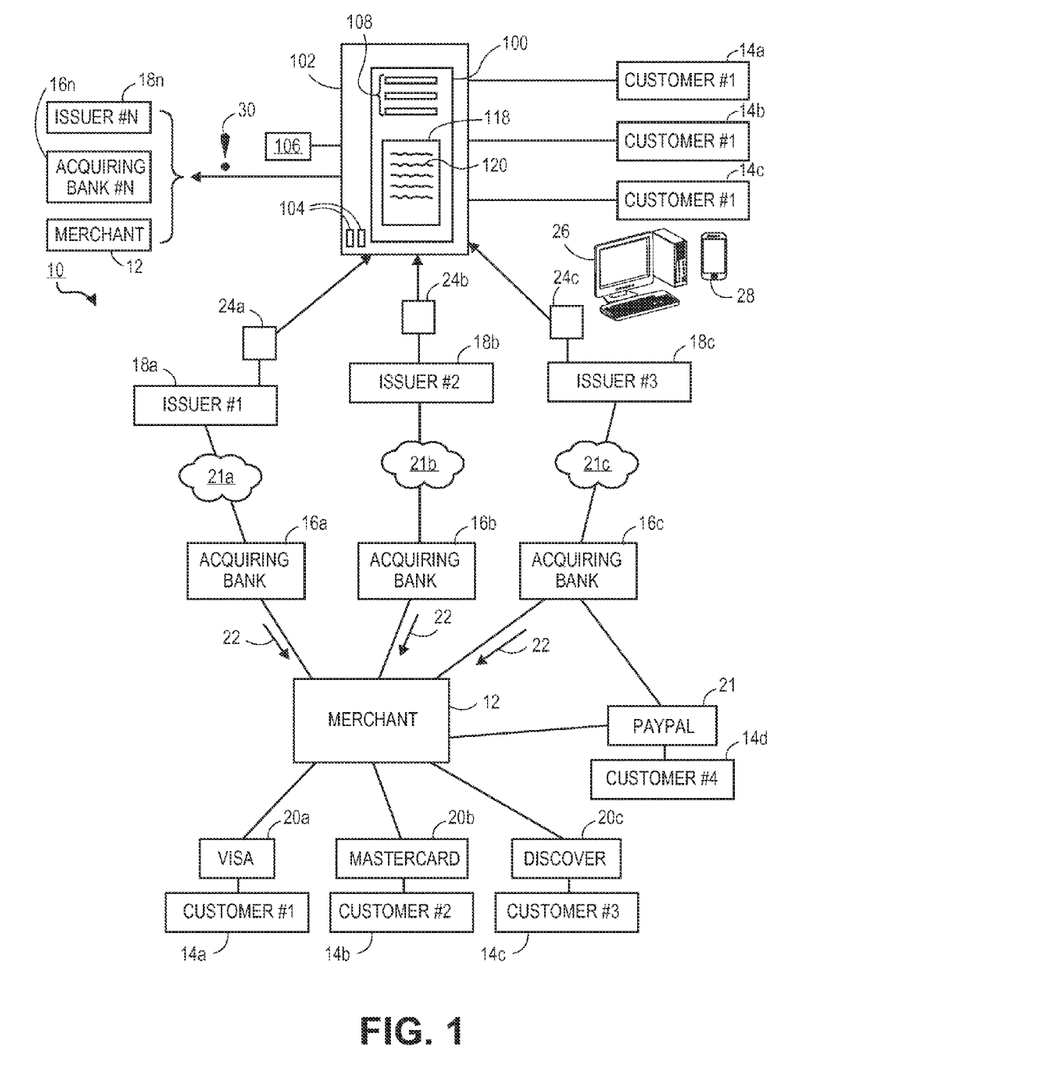
FIG. 1 illustrates a system for monitoring merchant financial transactions according to one embodiment.

FIG. 1 illustrates the general architecture of a system 10 for monitoring merchant financial transactions. Merchant financial transactions are financial transactions that occur between a merchant 12 and a customer 14a, 14b, 14c, 14d. Typically such transactions relate to a customer 14a, 14b, 14c, 14d purchasing goods or services from the merchant 12. The merchant 12 may have a physical presence in one or more locations in which case it is a "brick-and-mortar" type merchant 12. The merchant 12 may also include online merchants whereby goods or services are purchased over a network such as the Internet. Merchants 12 may also include businesses that have both brick-and-mortar stores as well as an online presence.

Customers 14a, 14b, 14c, 14d buy goods and/or services 12 from a merchant 12 using any number of payments methods. A customer 14a, 14b, 14c, 14d may use a debit or credit card as one example. As another example, a customer 14a, 14b, 14c, 14d may write a check. In some instances, the check may be converted to an immediate electronic transaction through ACH conversion. A customer 14a, 14b, 14c, 14d may also purchase goods and/or services using an online payment system such as PAYPAL and GOOGLE Wallet online payment systems and the like (customer 14d in FIG. 1). GOOGLE is a registered trademark of Google Inc., Mountain View, Calif. While the system 10 and methods described herein is able to monitor a wide variety of transactions, in one preferred embodiment, the system 10 monitors a subset of merchant financial transactions, namely, chargebacks (arrow 22 in FIG. 1). A "chargeback" is a transaction that is returned to a merchant 12 or a merchant's acquiring bank 16a, 16b, 16c as a financial liability. A merchant's acquiring bank 16a, 16b, 16c is a bank or other financial institution that processes credit and debit card payments. The reasons for such chargebacks may be numerous but they are often as a result of a disputed transaction, fraud, processing errors, or authorization issues. Customer disputes are one of the most common types of chargebacks. A customer 14a, 14b, 14c, 14d may dispute a transaction for any number of reasons. For example, a credit has not been processed when the customer expected it to be. Another example is when merchandise that was purchased form a merchant 12 (e.g., an online or mail-order merchant) was never received. Chargebacks also occur because a service was not performed as expected by a customer 14a, 14b, 14c, 14d. As an example of fraud, a customer 14a, 14b, 14c, 14d may initiate a chargeback when he or she did not make the alleged purchase. Chargebacks may indicate customer dissatisfaction and the potential for lost sales in the future so it is important that merchants address the underlying causes. Moreover, chargebacks can result in financial losses to either the acquiring bank or the merchant 12. For example, in a chargeback the merchant 12 may lose both the transaction amount and the merchandise.

FIG. 1 illustrates an example of a single merchant 12 that accepts debit or credit card payments from different debit/credit cards 20a, 20b, 20c. For example, card 20a is a VISA debit card. Card 20b may be a MASTERCARD credit card. Card 20c is a DISCOVER credit card. In this particular example, the merchant 12 accepts payment using any of these cards 20a, 20b, 20c. As seen in FIG. 1, the merchant 12 may also accept payment from an online payment system 21 like PayPal®. The merchant 12 in this example is connected with three acquiring banks 16a, 16b, 16c. In this particular example, a first acquiring bank 16a is used to process credit and debit transactions for VISA related debit and credit cards. The second acquiring bank 16b is used to process credit and debit transactions for MASTERCARD related debit and credit cards. The third acquiring bank 16c is used to process credit transactions for DISCOVER related credit cards. It should be understood that this is just one illustrative example. In other embodiments, a single acquiring bank 16a, 16b, 16c may process credit/debit transactions from different proprietary electronic payment platforms (e.g., acquiring bank 16c of FIG. 1).

Still referring to FIG. 1, each acquiring bank 16a, 16b, 16c is connected to an issuing financial institution ("issuer") 18a, 18b, 18c through an electronic payments system network 21a, 21b, 21c. For example, the first issuer 18a which may be a financial service provider such as a bank (e.g. Green Bank) is connected to the acquiring bank 16a via the VISA electronic payment system. The second issuer 18b (e.g., Red Bank) is connected to the acquiring bank 16b via the MASTERCARD electronic payment system. The third issuer 18c (e.g., Blue Bank) is connected to the acquiring bank 16c via the DISCOVER electronic payment system.

As seen in FIG. 1, the system 10 includes, in one embodiment, a financial management system (FMS) 100. FMS 100 is a financial application or tool that is used by consumers to manage their personal financial affairs. Typically, though not exclusively, the FMS 100 permits consumers to track their personal financial activities by collecting receipts, balancing accounts (e.g., checkbook accounts), tracking and paying bills, monitoring investments, loans, and the like.

Commercial examples of various FMS products include MINT, QUICKEN, QUICKBOOKS and FINANCEWORKS financial management products or systems that are available from Intuit Inc. MINT, QUICKEN, QUICKBOOKS and FINANCEWORKS are registered trademarks of Intuit Inc., Mountain View, Calif. These types of systems allow consumers or business owners to combine, process and categorize financial data and present numerical data in various forms or summaries such as balances or values, charts, graphs and reports. MINT®, QUICKEN®, QUICKBOOKS® and FINANCEWORKS® are registered trademarks of Intuit Inc., Mountain View, Calif.

For example, the MINT financial management system allows consumers to link their MINT account to the various financial accounts at respective financial service providers so that the consumer can view aggregated checking, savings, loan, credit card, stock and data of other linked accounts in a centralized location using their computer or mobile communication device. In addition to providing a composite view of data of multiple accounts, data of linked accounts may also be categorized to provide a better understanding to the consumer regarding their finances.

As seen in FIG. 1, the FMS 100 is run on a host computer 102. The host computer 102 may comprise one or more servers that are remotely accessed as described herein in further detail. The host computer 102 includes one or more processors 104 which are used execute software instructions in accordance with the methods described herein. It should be understood that the methods may be implemented by one or more dedicated processors 104 or, alternatively, software execution may be distributed across multiple processors 104. The host computer 102 may be controlled by a host 106 such as, for instance, financial services provider or financial management company such as Intuit Inc. of Mountain View, Calif., which provides or hosts financial management systems (FMS) such as MINT financial management system. In one embodiment, the FMS 100 may include the MINT program although it should be understood that the invention is not so limited.

Still referring to FIG. 1, the FMS 100 hosts user accounts 108. Typically, there are large numbers of users that have accounts 108 being hosted by the host computer 102. Each account 108 preferably includes multiple financial sub-accounts held by a plurality of different financial service providers for that particular user. Typically, these accounts include banking accounts (e.g., checking, saving, and money market accounts), investment accounts (for securities, bonds, and the like), as well as credit accounts for revolving lines of credit or loans.

Still referring to FIG. 1, a database 118 is configured to interface with the FMS 100. The database 118 contains aggregated merchant transaction data 120 from a plurality of users that utilize the FMS 100 on host computer 102. In this example, the users of the FMS 100 are also customers of the merchant 12 as explained below. In this regard, the database 118 is populated with merchant transaction data from all or substantially all of the users of the FMS 100 to create a richly populated database 118 containing transactions from many different merchants 12. As explained below, a single merchant 12 can be identified within this group whereby aggregated merchant transaction data 120 from a large number of users/customers can be analyzed for chargebacks 22. The user/customer set is not limited to a smaller population of users tied to a particular issuer 18a, 18b, 18b but rather aggregates merchant transaction data across platforms (e.g., VISA, MASTERCARD, DISCOVER and PAYPAL platforms). In this regard, the system 10 has a "God's eye" view of aggregated merchant transaction data 120 that can be mined or analyzed for transactions of interest like chargebacks 22.

In one preferred embodiment, the aggregated merchant transaction data 120 contains or is filtered to contain merchant transaction data of interest such as chargebacks 22. Using FIG. 1 as an example, assume that Customer#1 14a uses her VISA® debit card 20a to purchase goods from an online merchant 12. Customer#2 14b uses his MASTERCARD credit card 20b to also purchase goods from merchant 12. Customer#3 14c uses her DISCOVER credit card 20c to purchase goods from merchant 12. Customer#4 14d purchases goods from merchant 12 using PAYPAL electronic payment. In this example, Customer#1 14a, Customer#2 14b, and Customer#3 14c initiate chargebacks by contacting their respective card issuer 18a, 18b, 18c. For example, the goods from the merchant 12 were never delivered to Customer#1 14a, Customer#2 14b, and Customer#3 14c.

After the chargeback process is initiated, the issuer 18a, 18b, 18c and/or the acquiring bank 16a, 16b, 16c follow preset rules according to their own internal policies and contractual arrangements to validate or reject the chargeback 22. In this particular example, the chargebacks 22 are determined to be proper and the merchant 12 receives a chargeback for each separate transaction. In this example, Customer#1 14a receives a credit, Customer#2 14b receives a credit, and Customer#3 14b receives a credit. This credit will show up as a chargeback "credit" transaction on the transaction history associated with each account that was credited.

In this particular example, Customer#1 14a, Customer#2 14b, and Customer#3 14c have separate accounts 108 on the FMS 100 running on host computer 102. As part of the FMS 100 operations, financial transactions from the various financial service providers of each Customer#1 14a, Customer#2 14b, and Customer#3 14c are transferred from their respective service providers to the aggregated database 118. These transferred transactions include, in this example, financial transactions from issuers 18a, 18b, 18c. Typically, the host computer 102 will communicate with a computer 24a, 24b, 24c associated with each financial service provider (as seen in FIG. 1 issuers 18a, 18b, and 18c). The transferred transactions include the chargeback credit transactions that were posted to the accounts associated with the cards 20a, 20b, 20c. Each chargeback transaction is also associated with indicia identifying the merchant 12 such as a merchant name (or portion thereof) or merchant ID. The chargeback transaction also includes a posting date as well as an amount. Additional data may also accompany the chargeback transaction. For example, in some situations a reason code may accompany the chargeback transaction, with each reason code corresponding to a particular reason the chargeback occurred (e.g., Code 30—services not provided or merchandise not received).

Still referring to FIG. 1, the aggregated merchant transaction data 120 is obtained from electronic transaction data that is communicated to the host computer 102 via a networked link between the host computer 102 and computers 24a, 24b, 24c associated with each issuer 18a, 18b, 18c. The connection between the host computer 102 and the computers 24a, 24b, 24c is preferably made, at least temporarily, over a wide area network such as the Internet or a local area network.

The connection between the host computer 102 and the various computers 24a, 24b, 24c may be accomplished automatically by the FMS 100. For example, the FMS 100 may have a preset schedule whereby the FMS 100 queries each computer 24a, 24b, 24c for recent transaction activity. For instance, once per day the FMS 100 may prompt the host computer 102 to check for recent electronic transaction data that has not already been downloaded or otherwise transferred to the host computer 102. This operation preferably takes place in the background and does not require user input. More frequent querying of the computers 24a, 24b, 24c is also possible (e.g., once per hour). The more frequent that the queries are conduct increases the speed at which merchant chargebacks can be identified. For example, a user may save his or her account login and password information for each financial services provider in the FMS 100. The FMS 100 can then periodically log into each computers 24a, 24b, 24c whereby the electronic transaction data is obtained. The host computer 102 may invoke a script or other sequence of events to acquire the electronic transaction data. This includes, for example, techniques used for web scraping, screen scraping, and retrieval by running an API.

In another embodiment or aspect, the connection between the host computer 102 and the various computers 24a, 24b, 24c may occur as transactions are posted or otherwise occurring at the financial service providers 18a, 18b, 18c. In this embodiment, the respective computers 24a, 24b, 24c may originate contact with the host computer 102 letting the host computer 102 know that electronic transaction data is available for downloading. A connection between the host computer 102 and one or more of the computers 24a, 24b, 24c can be made to download any electronic transaction data. This embodiment has the advantage that the database 118 is updated substantially in real time as transactions occur.

In the embodiment of FIG. 1, the customers 14a, 14b, 14c may access the FMS 100 through a computer 26 (such as a laptop, desktop computer) or a mobile communication device 28 (such as a tablet computing device or a smartphone or PDA). The customer 14a, 14b, 14c may access the FMS 100 using, for example, a browser or other interface that operations on the computer 26 or mobile communication device 28. An alternative to using a browser may include a downloadable application or "app" that is executed on the mobile communication device 28 or even the computer 26. Typically, the customer 14a, 14b, 14c will need to provide a user name or ID as well as a password to access the FMS 100. It should be understood that customer 14a, 14b, 14c or even user may not necessarily refer to a single individual. Often, a customer 14a, 14b, 14c includes multiple people (e.g., husband and wife) who decide to household or combine accounts. While FIG. 1 illustrates only three customers 14a, 14b, 14c purchasing goods at the merchant 12 and further downloading merchant transaction data to FMS 100 it should be understood that the system 10 is meant to operate with many more customers/users such that a well-developed database of merchant transaction data is aggregated to best find merchant transaction data of interest (e.g., chargebacks 22).

As seen in FIG. 1, in one aspect of the invention, the FMS 100 may be configured to send a notification 30 when the merchant analyzer aspect of the FMS 100 (described in more detail below) identifies a triggering chargeback characteristic for the merchant 14. Although described in more detail below, a triggering chargeback characteristic may include the number of chargebacks tied to a particular merchant 14 exceeding a particular number. The triggering chargeback characteristic may also include a velocity of chargebacks or a change in the velocity (e.g., increase) of chargebacks. The triggering chargeback characteristic may also be tied to currency amount, for example, the total dollar amount of chargebacks or significant chargeback dollar amount. The triggering of the chargeback characteristic is used to flag a particular merchant 14 about problematic or suspect chargeback activity.

The notification 30 may be communicated to an issuer 18n (e.g., could be any of issuers 18a, 18b, 18c or others). The notification 30 may also be communicated to the acquiring bank 16n (e.g., could include any of acquiring banks 16a, 16b, 16c). The notification 30 may also be communicated to the particular merchant 12 so that the merchant 12 can implement corrective measures or other changes to mitigate additional chargeback activity. The notification 30 may be to all or some of these recipients. For example, if fraudulent activity on behalf of a merchant 12 is suspected, the notification 30 may not be sent to the merchant 12 so that the merchant 12 is not prematurely tipped off. The notification 30 may take any number of forms. For example, the notification 30 may include an electronic communication that can be sent by the host computer 102 and received by computers associated with the issuer#N 18n, acquiring bank#N 16n, or merchant 12. The electronic communication may include by way of example, data packet, e-mail, SMS message, or the like. The notification 30 could be also include an automated telephone call or the like. The notification 30 may also include a more traditional notification such as a computer-generated letter or the like.

Figure 2:
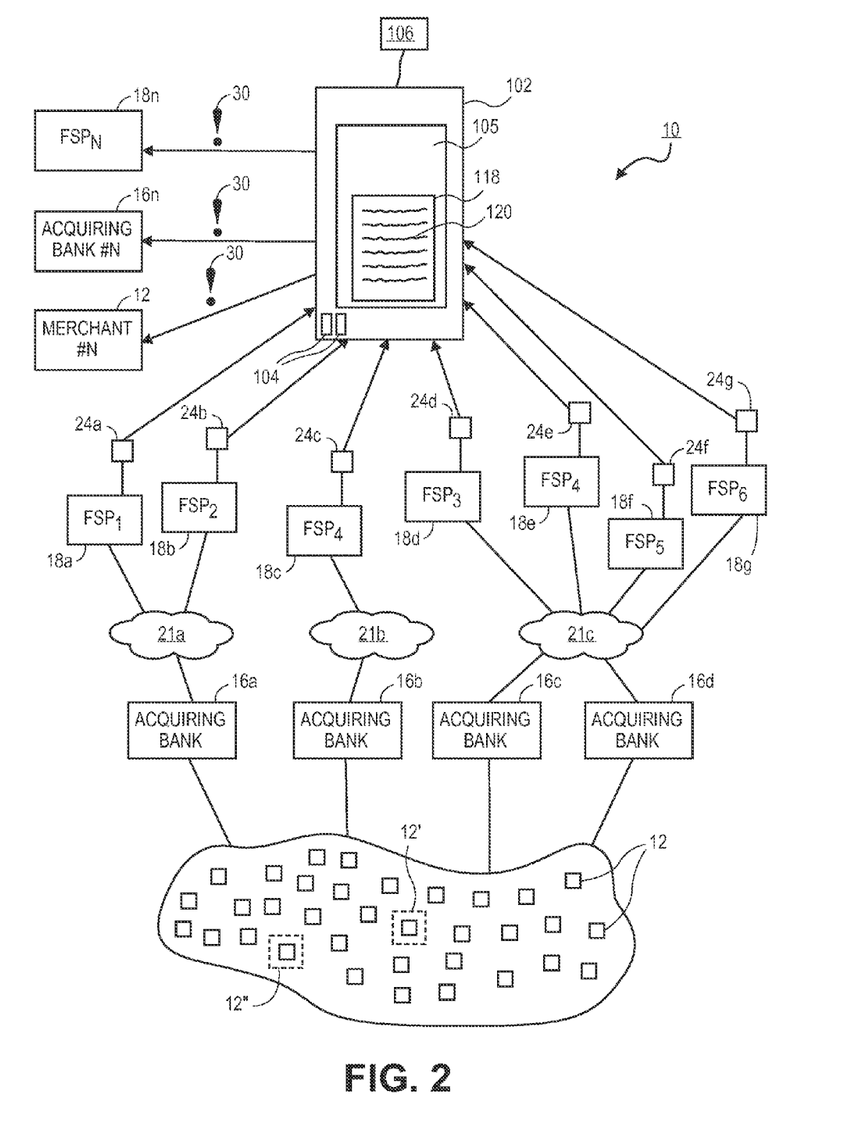
FIG. 2 illustrates a system for monitoring merchant financial transactions according to another embodiment.

FIG. 2 illustrates another embodiment of the invention. Similar reference numbers are given to similar aspects as to those elements described in the context of FIG. 1. In this embodiment, the host computer 102 maintains software 102 that is tied to the database 118. In this embodiment, the software 105 is not a FMS that is typically utilized by consumers. In this particular embodiment, there are no consumer accounts that are part of the software 105. Instead, each financial service provider (FPS$_n$) is linked to the host computer 102 via respective computers 24a-24g. Aggregated merchant transaction data 120 is transmitted to the database 118 by each FPS$_n$. Merchant transaction data 120 may be communicated periodically or in real-time or near real-time as transactions occur at the merchants 12.

Still referring to FIG. 2, in this particular example, a chargeback characteristic for two merchants 12', 12" has been identified by the software 105 analyzing the database 118 containing the aggregated merchant transaction data 102. The result is that these two merchants 12', 12" have been flagged by the software 105. In one embodiment, the financial service providers and the acquiring banks that do business with these merchants 12', 12" are sent a notification 30. For example, if merchant 12' processes transactions through acquiring bank 16a and FSP$_1$ 18a and FPS$_2$ 18b, any or all of these entities may be sent a notification 30. It is also possible that a notification 30 may be sent to the electronic payments system network 21a. In another embodiment, it is possible that a notification 30 is sent to out-of-network FSPs (e.g., FSP$_{4-6}$). Of course, merchant 12' may also be notified of its flagged status.

Unlike the embodiment of FIG. 1, this embodiment does not rely on a database 118 that is populated by information pulled as part of a FMS. Here, the potential universe of aggregated merchant transaction data 120 is much larger because merchant transaction data is captured for all customer transactions that take place within the system. In addition, while FIG. 2 illustrates the host computer 102 interfacing with respective computers 24a-24g associated with FSP$_{1-6}$, it is also possible for communication links to form between the electronics payment system networks 21a, 21b, 21c or the acquiring banks 16a-16d whereby merchant transaction data is pulled into the database 118 from these sources.

Figure 3:
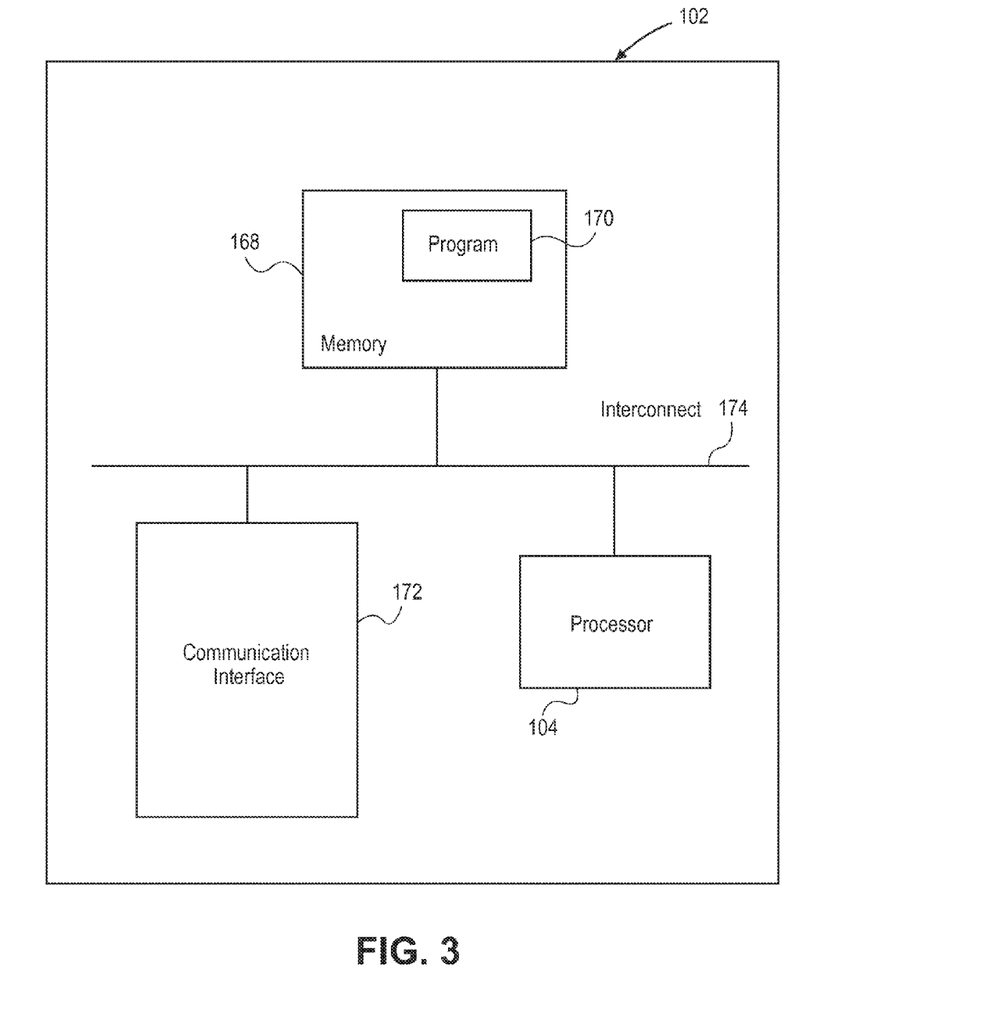
FIG. 3 generally illustrates components of a computing device such as host computer or other computer that may be utilized to execute the FMS or software.

FIG. 3 generally illustrates components of a computing device such as host computer 102 that may be utilized to execute the FMS 100 or software 105 and that includes a memory 168, program instructions 170, a processor or controller 104 to execute program instructions 170, a network or communications interface 172, e.g., for communications with a network or interconnect 174 between such components. The memory 168 may be or include one or more of cache, RAM, ROM, SRAM, DRAM, RDRAM, EEPROM and other types of volatile or non-volatile memory capable of storing data. The processor unit 104 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 174 may include a system bus, LDT, PCI, ISA, or other types of buses, and the communications or network interface may, for example, be an Ethernet interface, a Frame Relay interface, or other interface. The interface 172 may be configured to enable a system component to communicate with other system components across a network which may be a wireless or various other networks. It should be noted that one or more components of computing device may be located remotely and accessed via a network. Accordingly, the system configuration illustrated in FIG. 3 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 104 performs steps or executes program instructions 170 within memory 168 and/or embodied on the carrier to implement method embodiments.

Figure 4:
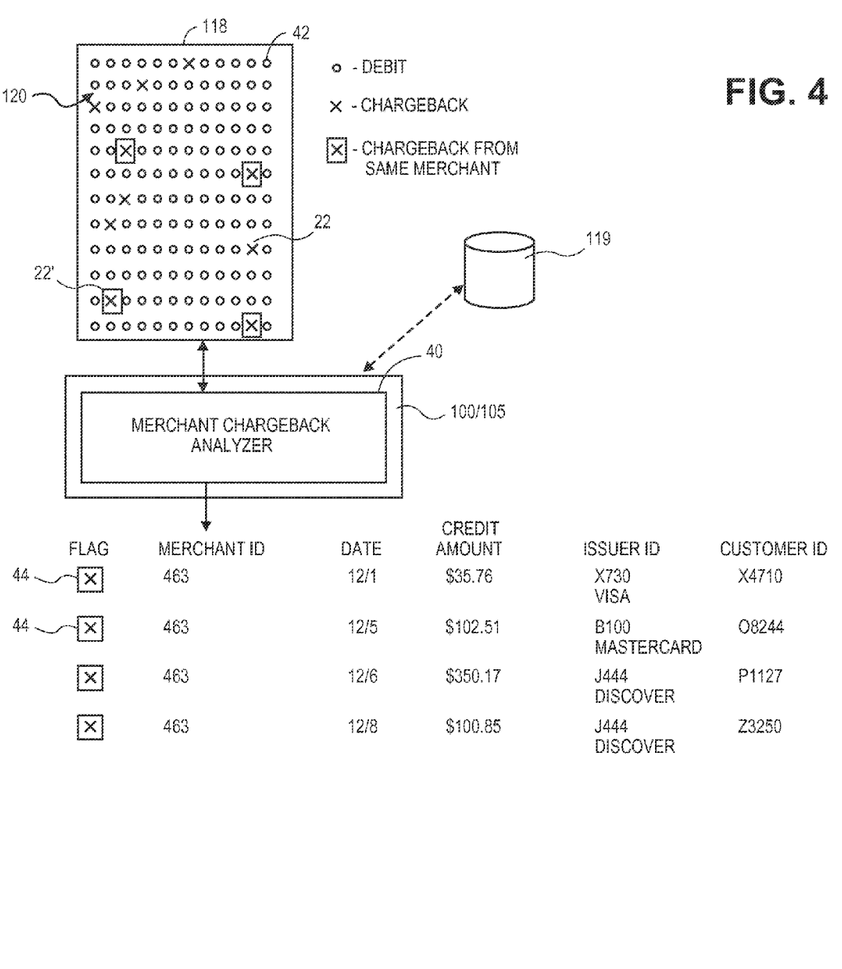
FIG. 4 illustrates a merchant chargeback analyzer operating on a database containing aggregated merchant financial data.

FIG. 4 illustrates a merchant chargeback analyzer 40 that is used as part of the FMS 100 or software 105. The merchant chargeback analyzer 40 interfaces with and analyzes aggregated merchant transaction data 102 contained within the database 120. The merchant chargeback analyzer 40 scans the aggregated merchant transaction data 102 which may include, for example, debit transactions 42 and chargebacks 22. FIG. 4 further shows how the merchant chargeback analyzer 40 is able to identify those chargebacks 22' that are from the same merchant 12. In this particular illustrative embodiment, there are four (4) chargebacks 22' from this merchant 12. FIG. 4 illustrates the chargeback 22' transaction details. In this example, the merchant chargeback analyzer 40 has flagged these transactions with flags 44. While the particular data fields that make up the merchant transaction data may vary, in this particular example, the merchant transaction data includes a merchant ID, a transaction date, a credit amount (for the chargeback), an issuer ID, and a customer ID. It should be noted that fewer or additional data fields may accompanying any particular transaction.

The merchant chargeback analyzer 40 may analyze the aggregated merchant financial data 120 for one or more chargeback characteristics that, if present, will cause the merchant chargeback analyzer 40 to flag a particular merchant 12. Various algorithms are contemplated that can be used by the merchant chargeback analyzer 40. For example, the merchant chargeback analyzer 40 may flag a merchant 12 once a preset threshold number of chargebacks 22' have occurred at the merchant 12. The threshold number of chargebacks 22' may be set for a particular time period (e.g., month, week, day). The merchant chargeback analyzer 40 may also flag a particular merchant 12 if a velocity of the chargebacks 22' reaches a preset threshold. For example, even if a total number of chargebacks 22' over a monthly period may be below a preset threshold, it may be discovered that over the past two days that a large number of chargebacks 22' have occurred. This spike in the velocity of chargebacks 22' can cause the merchant to be flagged. As another example, the chargebacks characteristic may also incorporate the amount of the cumulative chargebacks 22' or the individual amounts of each chargeback 22'. For example, a merchant 12 can be flagged when the total (currency-based) amount of chargeback 22' exceeds a preset threshold. Alternatively, a merchant 12 can be flagged when, for example, several recent chargebacks 22' are each over a certain dollar threshold (e.g., each chargeback 22' was over $100.00). A merchant 12 can also be flagged depending on the type of chargeback 22'. For example, failure to deliver goods may be given a higher priority than a chargeback for goods that were delivered but were damaged or not the goods described. Various reasons for chargebacks may be given different weightings and these may be incorporated into the algorithms used by the merchant chargeback analyzer 40.

It is important to note that the merchant chargeback analyzer 40 is able to flag transactions that occur on multiple platforms. With reference to the four transactions flagged in FIG. 4, a single transaction has taken place on each of the VISA and MASTERCARD platforms, while two flagged transactions have occurred on the DISCOVER platform. All of these transactions have occurred at a single merchant 12. While each platform may have their own ability to monitor chargebacks, these monitoring solutions would not have flagged the merchant 12 because they are only looking at chargebacks 22' occurring in their own proprietary network (e.g., VISA, MASTERCARD, and DISCOVER networks). The current system 10 is advantageous in that it can quickly identify and flag merchants 12 by having a "Gods eye view" across multiple payment platforms.

In some situations, the aggregated merchant transaction data 120 may not include a merchant ID that identifies the merchant 12. Instead, the aggregated merchant transaction data 120 may include a merchant name or a portion of a merchant name. In such a situation, the FMS 100 or software 105 may communicate with a separate database 119 (as seen in FIG. 4) that associates all or a portion of a merchant name with a particular merchant 12.

Figure 5:
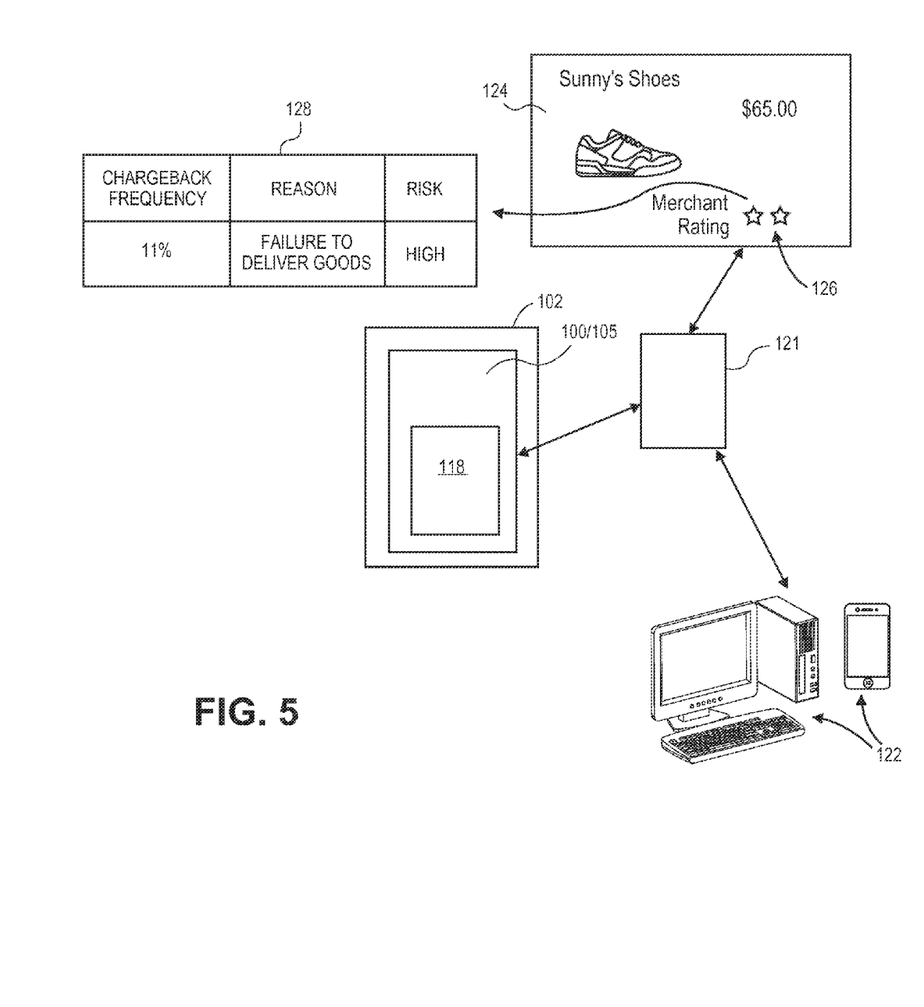
FIG. 5 illustrates another embodiment of a system that includes a merchant database with chargeback information.

FIG. 5 illustrates another aspect of the system 10. In this aspect, database 121 is associated with the FMS 100 or software 105 and contains chargeback information with respect to merchants 12. Chargeback information may include historical or current information regarding chargebacks 22 that have occurred at the merchant. The information contained in the database 121 is preferably assessable by customers or potential customers to evaluate whether or not they would like to do business with a particular merchant 12. The information contained in the database 121 may also be accessible by financial service providers in some embodiments. The information may be accessed from a computer or computing device 122. For example, a customer may look-up a particular info on a merchant to evaluate chargeback 22 metrics. For example, the database 121 may contain information on the amounts, frequency, and reasons why chargebacks 22 occur at the merchant 12. If the merchant 12 has a high frequency of chargebacks, a customer may want to take her business elsewhere.

The database 121 may also be optionally linked or otherwise connected to a merchant's online shopping marketplace. FIG. 5 illustrates a representation of an online website 124 for Sunny's Shoes, an online retailer for shoes. For example, the chargeback metrics may be converted to a ranking system 126 (e.g., stars, numerical ranking, percentage or the like) that is presented to the potential customer on the website interface of the online shopping marketplace. For example, a merchant 12 with a high frequency of chargebacks may be given a single star while another merchant 12 with a low frequency of chargebacks may be given a four star ranking. In one aspect, a customer may be able to drill down more deeply within this initial ranking to obtain additional details 128 behind the ranking. For example, a user may be able to find out a top reason that chargebacks 22 occur for a particular merchant 12 is that products were never shipped to the customer.

Figure 6:
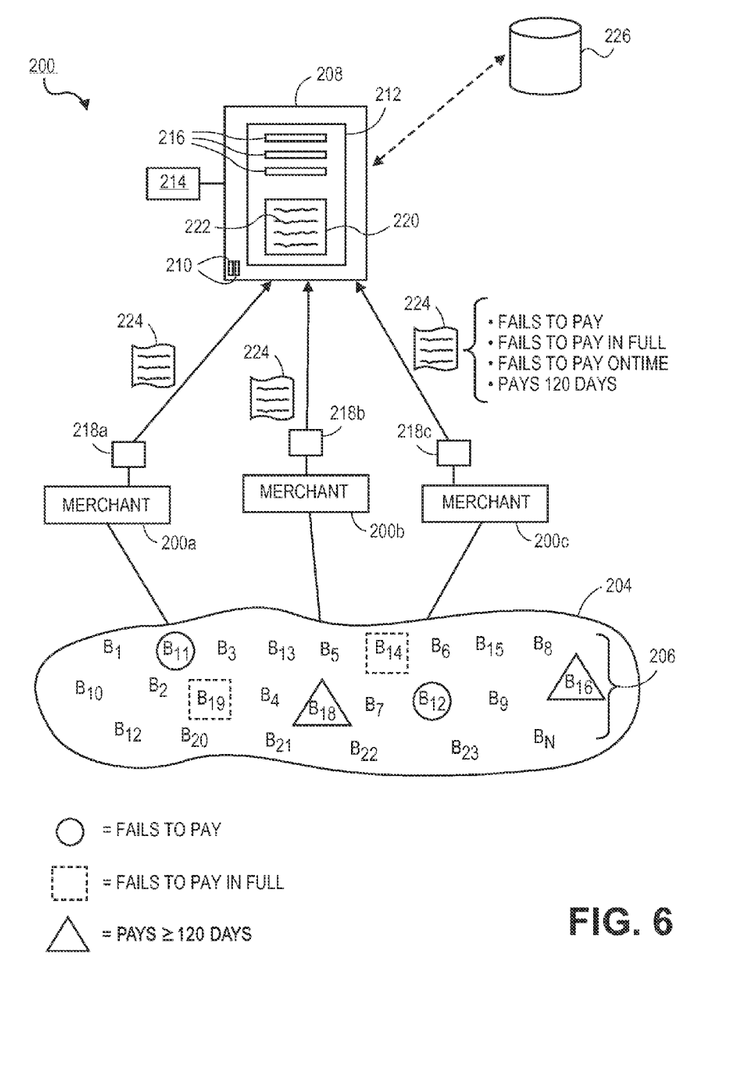
FIG. 6 illustrates another embodiment of a system that is configured to identify businesses with problematic payment characteristics.

FIG. 6 illustrates another embodiment of a system 200 for monitoring merchant transactions. In this embodiment, different merchants 200a, 200b, 200c engage in various transactions with other merchants or businesses. FIG. 6 illustrates a pool 204 of merchants identified as businesses 206 in this particular embodiment. For example, business $B_{11}$ may purchase office supplies from merchant 200a. In this particular example, business $B_{11}$ purchases the business supplies from merchant 200a on credit. Merchant 200a sends the goods to business $B_{11}$ along with an invoice for payment. In this particular example, the normal terms of payment may be date of invoice +30 days. Along these same lines, merchant 200b may sell widgets to business $B_{14}$. Widgets are shipped to business $B_{14}$ along with an invoice for payment. In FIG. 6, merchant 200c may sell services (e.g., professional services) to business $B_{16}$. Merchant 200c may send periodic (e.g., monthly) invoices to the business $B_{16}$. As seen in FIG. 6, the pool 204 may contain a large number of businesses 206 in which do business with any number of merchants including merchants 200a, 200b, and 200c. It should be noted that the pool 204 is merely illustrative of a large universe of businesses 206.

Still referring to FIG. 6, the system 200 includes a host computer 208 that contains one or more processors 210 which are used execute software instructions from FMS 212 that is loaded on the host computer 208. The host computer 208 may comprise one or more servers that are remotely accessed as described herein. It should be understood that the methods may be implemented by one or more dedicated processors 210 or, alternatively, software execution may be distributed across multiple processors 210. The host computer 208 may be controlled by a host 214 such as, for instance, financial services provider or financial management company such as described previously.

Still referring to FIG. 6, the FMS 212 hosts user accounts 216. Typically, there are large numbers of merchants that have accounts 216 being hosted by the host computer 208. In this particular example, merchants 200a, 200b, 200c have accounts within the FMS 212. For instance, the FMS 212 may include QUICKBOOKS ONLINE financial management system and each merchant 200a, 200b, 200c may have a QUICKBOOKS ONLINE account 216. Financial transactions pertaining to the merchant 200a, 200b, 200c is managed using the FMS 212. The FMS 212 may be used for a number of different tasks such as, for instance, to send estimates and invoices, print checks and record transactions, manage the payment of bills to vendors, track inventory, pay employees, and the like.

Any particular merchant 200a, 200b, 200c typically accesses the FMS 212 using a respective computing device 218a, 218b, 218c. The computing device 218a, 218b, 218c may include a computer such as a laptop or personal computer. The computing device 218a, 218b, 218c may also include a portable computing device such as a tablet or even a mobile communication device (e.g., Smartphone). In some instances the functionality of the FMS 212 is accessed via an Internet browser that is run on the computing device 218a, 218b, 218c. However, in other instances, a dedicated application or "app" may be used to access the FMS 212. For example, for some mobile communication devices an "app" may be downloaded to interface with the FMS 212.

Still referring to FIG. 6, a database 220 is configured to interface with the FMS 212. The database 220 contains aggregated merchant transaction data 222 from a plurality of merchants 200a, 200b, 200c that utilize the FMS 212 on host computer 208. Individual merchant transaction data 224 is transmitted to the host computer 208 via, for example, the respective computing devices 218a, 218b, 218c. Individual merchant transaction data 224 may include a number of different data fields. For example, merchant transaction data 224 may include the name or identification of a particular business 206 (e.g., business $B_{11}$), a transaction amount, and transaction date and/or time, description of the goods or services that are the subject of the transaction, invoice number paid, etc.

The database 220 is populated with merchant transaction data from all or substantially all of the FMS 212 account holders 216 to create a richly populated database 220 containing transactions from many different merchants. In one particular aspect, the database 220 contains merchant transaction data that identifies or can be processed or otherwise analyzed by the FMS 212 to identify financial information of interest. Financial information of interest may include payment or non-payment histories for individual businesses 206. For example, the FMS 212 may analyze the merchant transaction data 222 within the aggregated database 220 and then identify those businesses that fail to pay their invoices, fail to pay their invoices in full (e.g., short pays), fails to pay invoices on time (e.g., late payer). Additionally, the FMS 212 may analyzer the merchant transaction data 22 within the aggregated database 220 to identify those businesses with significant outstanding payables (e.g., payables over a certain threshold dollar amount). In this regard, the FMS 212 is able to identify or flag those businesses 206 that have poor or unacceptable payment practices or histories.

In one embodiment, an optional database 226 is provided which can store the identities of these businesses 206 with poor or unacceptable payment practices or histories. The database 226 may also contain relevant information on why these businesses 206 were flagged (e.g., non-payment, slow payer, short payer, and the like). In one aspect, this database 226 is accessible or open to querying by merchants and business. In this regard, the database 226 could be searched by a merchant or business before any transaction is consummated. For example, a search of the database 226 may indicate that business $B_{11}$ fails to pay invoices. A merchant that finds this information may refuse to engage in any commerce with business $B_{11}$ given its non-payment of invoices. In one aspect of the invention, the database 226 may be integrated into the functionality of the FMS 212 such that account holders 216 have access to this information prior to engaging in transactions with a particular business or merchant.

FIG. 6 illustrates a pool 204 of businesses 106 of which several have been identified by the FMS 212 as merchants 206 that have poor or unacceptable payment practices or histories. In this particular example, business $B_{11}$ and business $B_{17}$ have been identified as a business that has a history of failing to pay. Businesses $B_{14}$ and $B_{19}$ have been identified as business that have a history of failing to pay invoices in full (e.g., short payers). Businesses B16 and B18 have been identified by the FMS 212 as businesses with a history of late payments. For example, a threshold may be set by the FMS 212 to identify businesses with an average time to pay invoices that are greater than a certain amount of elapsed time (e.g., 30 days, 60 days, 90 days, 120 days).

Figure 7:
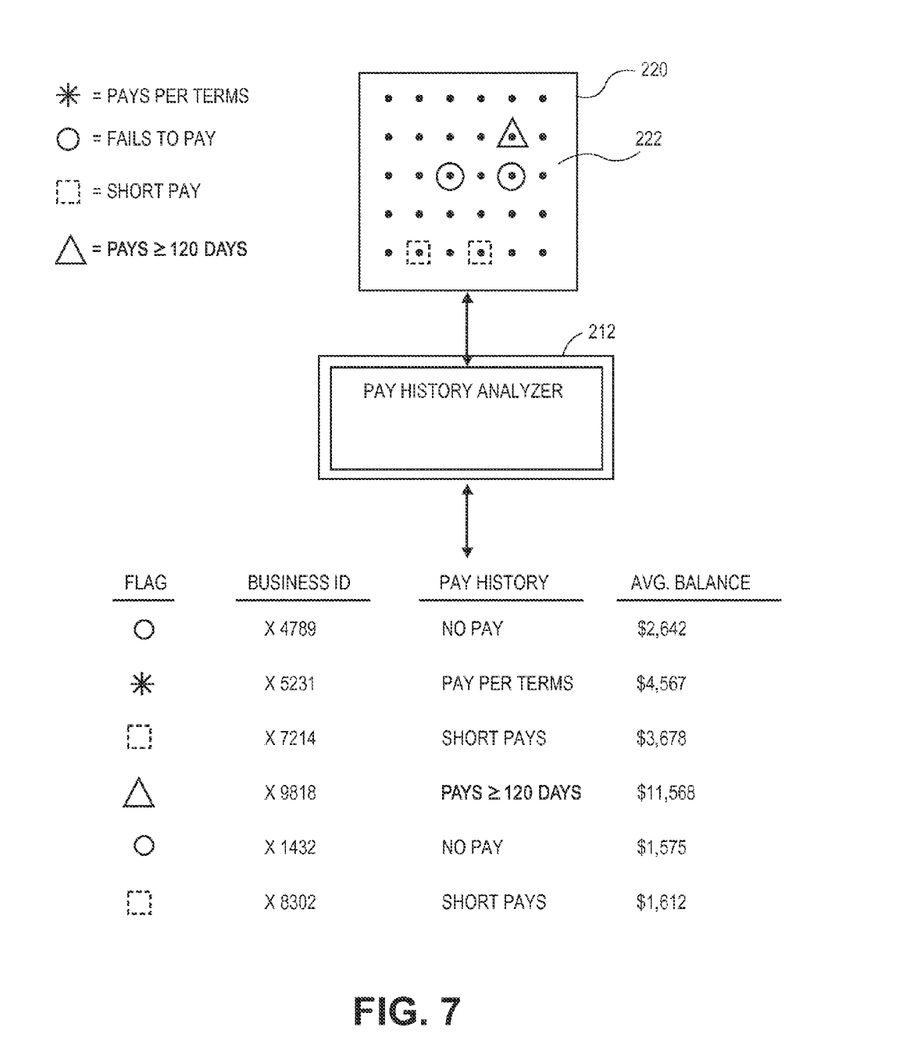
FIG. 7 illustrates a pay history analyzer component of the system of FIG. 6 identifying business with problematic payment characteristics.

FIG. 7 illustrates a pay history analyzer 228 that is part of the FMS 212. The pay history analyzer 228 scans or analyzes the data 222 within the aggregated database 220 to identify or flag those businesses with poor or unacceptable payment practices or histories. The pay history analyzer 228 may determine the elapsed time between issuance of an invoice and payment made to that invoice. In one embodiment, the pay history analyzer 228 may use transaction dates that are entered into or otherwise transferred to the FMS 212. In another alternative embodiment, the FMS 212 may use OCR techniques to determine the respective dates of when an invoice was generated and paid. The FMS 212 may analyze invoices and/or payments through various processing dates e.g., wire dates, check dates, check deposit date, and the like.

FIG. 7 illustrates the pay history analyzer 228 identifying businesses with poor or unacceptable payment histories. The pay history analyzer 228 scans or analyzes the merchant transaction data 222 for each business and can determine, for example, the frequency at which invoices get paid (or not paid) by a particular business, the length of time between when an invoice is generated and when payment is made, as well as payment amounts. In this example, the pay history analyzer 228 has found two businesses that fail to pay, one business that pays late (e.g., greater than 120 days), and two businesses that short pay invoices. As seen in FIG. 7, it is also possible that the pay history analyzer 228 is able to identify businesses or merchants that pay according to terms but, generally, the system 200 is designed to identify those problematic merchants or businesses. The pay history analyzer 228 may also identify businesses based on the outstanding amount due (e.g., average outstanding balance). This information may also be used to identify and flag potential problematic businesses. For example, a business that short pays invoices and maintains a high balance owed may indicate financial troubles.

The pay history analyzer 228 may be tuned to identify merchants or businesses that reach a preset payment characteristic or metric. The characteristic may include, as an example, non-payment of invoices, late payment of invoices, and short payment of invoices. For example, a short payer may be identified when a certain number or percentage of short pays has been met or exceeded. The metric may be an absolute number of transactions within a period of time or it may be a percentage of transactions or it may be weighed against the amount of money due. The same goes for identifying a non-paying or late paying business. A non-payer may be identified when a certain number or percentage of non-pay transactions have been met or exceeded. Likewise a late paying business may be identified when a certain number or percentage of payments are late. The number or percentage may be adjusted in some instances to different values by a user to. Moreover, what defines a payment being late may be based on an absolute number of elapsed days (e.g., over 90 days or 120 days) or alternatively, the system 200 may include a database (like database 226) that has includes payment terms associated with a particular business or merchant. In this regard, late payments may be associated with compliance with any particular merchant payment terms. A merchant or business may also be flagged based on a combination of payment characteristics with various weightings given to each. For example, non-payment of invoices may be given a weighting of 60% with late payments given a 25% weighting and 15% weighting given to short pays. Other problematic payment characteristics are also contemplated.

While FIG. 6 illustrates a system 200 in which the FMS 212 is hosted on a remote host computer 208 it is also possible that the FMS 212 may be hosted locally on computers (e.g., computers 218a, 218b, 218c) associated with each merchant 200a, 200b, 200c (e.g., QUICKBOOKS financial management system run locally on computers 218a, 218b, 218c). In this alternative embodiment, the FMS 212 may transmit merchant transaction data to the database 220, which may be remotely accessible by the FMS 212 located on each respective computer associated with each merchant 200a, 200b, 200c.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Further, it will be understood that embodiments can be implemented using various types of computing or mobile communication devices. Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computer-implemented method of detecting a merchant with chargeback activity comprising:
   a computing device hosting a plurality of financial management system (FMS) user accounts receiving merchant financial data from a plurality of different financial service providers for the plurality of FMS user accounts respectively associated with a plurality of consumers of a single merchant, wherein the merchant financial data comprises chargebacks;
   the computing device aggregating the received merchant financial data obtained from the plurality of FMS user accounts;
   the computing device analyzing the chargebacks within the aggregated merchant financial data of the single merchant for a chargeback characteristic; and
   the computing device flagging the merchant when the chargeback characteristic exceeds preset levels, wherein the chargeback characteristic comprises one of total number of chargebacks, velocity of chargebacks, dollar amount of chargebacks, and total number of chargebacks of a particular type.

2. The computer-implemented method of claim 1, further comprising notifying at least one of the financial service providers about the flagging of the merchant.

3. The computer-implemented method of claim 2, wherein each of the plurality of financial service providers is notified about the flagging of the merchant.

4. The computer-implemented method of claim 2, wherein the notifying comprises an electronic communication.

5. The computer-implemented method of claim 3, wherein the notifying comprises an electronic communication.

6. The computer-implemented method of claim 1, further comprising notifying the flagged merchant regarding its flagged status.

7. The computer-implemented method of claim 1, further comprising notifying a holder of at least one of the plurality of FMS user accounts users about the flagging of the merchant.

8. The computer-implemented method of claim 1, wherein the merchant financial data from the plurality of different financial service providers is periodically received by the computing device.

9. The computer-implemented method of claim 1, wherein the merchant financial data from the plurality of different financial service providers is automatically transmitted to the computing device.

10. The computer-implemented method of claim 1, further comprising storing the flagged merchant in a database.

11. The computer-implemented method of claim 1, wherein the chargeback characteristic comprises one of total number of chargebacks.

12. A system for detecting a merchant with chargeback activity comprising:
   a computing device hosting a plurality of financial management system (FMS) user accounts respectively associated with a plurality of consumers of a single merchant, the computing device configured to receive merchant financial data from a plurality of different financial service providers for the plurality of FMS user accounts, wherein the merchant financial data comprises chargebacks;
   a database operably connected to the computing device and configured to contain aggregated merchant financial data obtained from the plurality of FMS user accounts;
   a merchant chargeback analyzer executable by the computing device, the merchant chargeback analyzer configured to analyze chargebacks within the aggregated merchant financial data of the single merchant for a chargeback characteristic; and
   wherein the computing device is configured to flag the merchant when the chargeback characteristic exceeds preset levels, wherein the chargeback characteristic comprises one of total number of chargebacks, velocity of chargebacks, dollar amount of chargebacks, and total number of chargebacks of a particular type.

13. The system of claim 12, the computer being configured to notify at least one of the financial service providers about the flagging of the merchant.

14. The system of claim 12, the computer being configured to notify the flagged merchant regarding its flagged status.

15. The system of claim 12, further comprising a flagged merchant database.

16. The system of claim 15, wherein the flagged merchant database is publicly accessible by one or more potential customers.

17. The system of claim 12, wherein the chargeback characteristic comprises one of total number of chargebacks.

18. A computer-implemented method of detecting businesses with problematic payment histories comprising:

a computing device hosting a plurality of financial management system (FMS) merchant accounts receiving financial transaction data from a plurality of different businesses, wherein the financial transaction data comprises payment data of the businesses engaging in commerce with respective merchants;

the computing device aggregating the received financial transaction data, wherein the payment data is obtained from the plurality of FMS merchant accounts;

the computing device analyzing the chargebacks within the aggregated financial transaction data for a payment characteristic for the businesses; and the computing device flagging a business when the payment characteristic of a business exceeds a preset threshold, wherein the payment characteristic comprises one of a failure to pay metric, a late pay metric, and a short pay metric.

19. A system for detecting businesses with problematic payment histories comprising:

a computing device hosting a plurality of financial management system (FMS) merchant accounts configured to receive financial transaction data from a plurality of different businesses, wherein the financial transaction data comprises payment data of the businesses engaging in commerce with respective merchants;

a database operably connected to the computing device and configured to contain aggregated financial transaction data, wherein the payment data is obtained from the plurality of FMS merchant accounts;

a pay history analyzer executable by the computing device, the pay history analyzer configured to analyze the chargebacks within the aggregated financial transaction data of a single business for a payment characteristic; and wherein the computing device is configured to flag the business when the payment characteristic exceeds a preset threshold, wherein the payment characteristic comprises one of a failure to pay metric, a late pay metric, and a short pay metric.

* * * * *